US007283136B2

(12) United States Patent
Chartier et al.

(10) Patent No.: US 7,283,136 B2
(45) Date of Patent: Oct. 16, 2007

(54) CELL DESCRIPTOR

(75) Inventors: Valentin Chartier, Boulogne (FR); Francois Delaplace, Paris (FR)

(73) Assignee: Dassault Systemes (FR)

( * ) Notice: Subject to any disclaimer, the term of this patent is extended or adjusted under 35 U.S.C. 154(b) by 0 days.

(21) Appl. No.: 09/815,896

(22) Filed: Mar. 23, 2001

(65) Prior Publication Data
US 2002/0180735 A1 Dec. 5, 2002

(51) Int. Cl.
*G06T 17/40* (2006.01)
*G06T 17/50* (2006.01)

(52) U.S. Cl. .................... 345/440; 345/619; 700/97; 700/98

(58) Field of Classification Search ........ 345/440–443, 345/802–803, 964, 184, 419–420, 473, 619, 345/701–702; 716/2–3, 11, 17–18; 700/97, 700/98
See application file for complete search history.

(56) References Cited

U.S. PATENT DOCUMENTS

| | | | | |
|---|---|---|---|---|
| 4,701,583 A | * | 10/1987 | Mitsukuchi et al. | 218/71 |
| 4,791,583 A | * | 12/1988 | Colburn | 345/420 |
| 5,337,407 A | | 8/1994 | Bates et al. | |
| 5,345,490 A | * | 9/1994 | Finnigan et al. | 378/4 |
| 5,519,627 A | * | 5/1996 | Mahmood et al. | 716/18 |
| 5,821,925 A | * | 10/1998 | Carey et al. | 715/757 |
| 5,960,173 A | * | 9/1999 | Tang et al. | 709/201 |
| 5,973,678 A | * | 10/1999 | Stewart et al. | 345/184 |
| 6,113,647 A | * | 9/2000 | Silve et al. | 716/11 |
| 6,272,671 B1 | * | 8/2001 | Fakhry | 716/18 |
| 6,323,863 B1 | * | 11/2001 | Shinagawa et al. | 345/441 |
| 6,445,390 B1 | * | 9/2002 | Aftosmis et al. | 345/421 |
| 6,453,328 B1 | * | 9/2002 | Schaeffer et al. | 715/515 |
| 6,470,489 B1 | * | 10/2002 | Chang et al. | 716/21 |
| 6,629,065 B1 | * | 9/2003 | Gadh et al. | 703/1 |
| 6,636,211 B2 | * | 10/2003 | Chartier et al. | 345/420 |
| 6,912,565 B1 | * | 6/2005 | Powers et al. | 709/205 |

(Continued)

FOREIGN PATENT DOCUMENTS

EP    1244062 A2 *    9/2002

(Continued)

OTHER PUBLICATIONS

Rossignac, J.R., O'Connor, M.A., "SGC: A dimension-independent model for pointsets with internal structures and incomplete boundaries," Geometric Modeling for Product Engineering, M.J. Wozny, J.U. Turner and K. Preiss, Eds., North-Holland, 1990, pp. 145-180.*

(Continued)

*Primary Examiner*—Kee M. Tung
*Assistant Examiner*—Javid A Amini
(74) *Attorney, Agent, or Firm*—Clifford Chance US LLP

(57) ABSTRACT

A method, system and apparatus for use in computer-aided design, computer-aided manufacturing, computer-aided engineering and product lifecycle management. Cell descriptors are used to identify one or more geometric cells of a model. The cell descriptors are in the form of scripts specifying constraints or filters for identifying cells. The constraints are based on characteristics of items in the model, or associations between items in a model, that are readily discernable to the user, and are therefore easily written and susceptible to easy distribution to other systems.

4 Claims, 4 Drawing Sheets

U.S. PATENT DOCUMENTS

| | | | | |
|---|---|---|---|---|
| 2002/0180735 | A1* | 12/2002 | Chartier et al. | 345/440 |
| 2002/0183878 | A1* | 12/2002 | Chartier et al. | 700/98 |

FOREIGN PATENT DOCUMENTS

| | | | |
|---|---|---|---|
| EP | 1271412 A2 * | 1/2003 | |
| GB | 2 354 096 | 3/2001 | |
| JP | 05-233735 A | 9/1993 | |
| JP | 07-334557 A | 12/1995 | |
| JP | 08-129572 A | 5/1996 | |
| JP | 08-329139 A | 12/1996 | |
| JP | 10-149432 A | 6/1998 | |
| JP | 10-240790 A | 9/1998 | |
| JP | 11-085826 A | 3/1999 | |
| JP | 11-126219 A | 5/1999 | |

OTHER PUBLICATIONS

Machien interpretation of CAD data for manufacturing applications Qiang Ji, Michael M. Marefat, Sep. 1997 ☐☐.*

Geometric Programming: A Programming Approach to Geometric Design, Alberto Paoluzzi, Terza Universit?i di Roma☐☐Valerio Pascucci, and Michele Vicentino, University La Sapienza; 1995.*

"Modeling Primitives"; an object oriented formulation of boundary value problems in a solid geometric modeling context Taylor C. Wilson, Jeffrey A. Talbert, Jordan J. Cox Jun. 1993 Proceedings on the second ACM symposium on Solid modeling and applica.*

Auto CAD 2000 Bible, Ellen Finkelstein, pp. 682-684, 1999.*

A constraint-driven solid modeling open environment Wenhsyong Lin, Arvid Myklebust,Jun. 1993 Proceedings on the second ACM symposium on Solid modeling and applications.*

Unified geometric modeling by non-manifold shell operation Masatake Higashi, Hideki Yatomi, Yoshihiro Mizutain, Shin-ichi Murabata Jun. 1993 Proceedings on the second ACM symposium on Solid modeling and applications.*

A hybrid CAD/CAM system for mechanical applications J. Z. Gingerich, M. P. Carroll, E. J. Chellius, L. P. Kuan Jan. 1982 Proceedings of the 19th conference on Design automation.*

Topological design of sculptured surfaces Helaman Ferguson, Alyn Rockwood, Jordan Cox, Jul. 1992 ACM SIGGRAPH Computer Graphics, Proceedings of the 19th annual conference on Computer graphics and interactive techniques SIGGRAPH '92, vol. 26 Issue.*

Analysis of boundary representation model rectification Guoling Shen, Takis Sakkalis, Nicholas Patrikalakis May 2001 Proceedings of the sixth ACM symposium on Solid modeling and applications SMA '01 Publisher: ACM Press.*

A model for multimodal reference resolution Luis Pineda, Gabriela Garza Jun. 2000 Computational Linguistics, vol. 26 Issue 2 Publisher: MIT Press.*

Offsetting operations on non-manifold boundary representation models with simple geometry Sang Hun Lee Jun. 1999 Proceedings of the fifth ACM symposium on Solid modeling and applications SMA '99 Publisher: ACM Press.*

Computing the Voronoi diagram of a 3-D polyhedron by separate computation of its symbolic and gemoetric parts Michal Etzion, Ari Rappoport Jun. 1999 Proceedings of the fifth ACM symposium on Solid modeling and applications SMA '99 Publisher: ACM Press.*

V. Capoyleas et al., "Generic Naming in Generative, Constraint-Based Design", *Computer-Aided Design*, vol. 28, No. 1, 1996, pp. 17-26.

Rossignac, J. R., O'Connor, M. A., "SGC: A Dimension-Independent Model for Pointsets with Internal Structures and Incomplete Boundaries", Geometric Modeling for Product Engineering, M. J. Wozny, J. U. Turner and K. Preiss, Eds., North-Holland, 1990, pp. 145-180.

Sriram, Wong, and He, "GNOMES: an object-oriented nonmanifold geometric engine", Computer-Aided Design, vol. 27, No. 11, pp. 853-868 (1995).

R. Jones et al., "Constraint-Based Interactive Assembly Planning," *Proceedings of the 1997 IEEE International Conference on Robotics and Automation*, Apr. 20-25, 1997, vol. 2, pp. 913-920.

F. Goo et al., "Form Topology and Semantics: A Novel Definition of Design-with Features," *International Conference on Data and Knowledge Systems for Manufacturing and Engineering*, May 2, 1994, vol. 1, pp. 19-24.

European Search Report for European Application No. 02290633 dated Feb. 16, 2005.

European Search Report dated Jan. 23, 2006 for EP application No. 02291494.9.

Konduri, G., et al., "A Framework for Collaborative and Distributed for Web-Based Design", Design Automation, Jun. 21, 1999, pp. 896-903.

Hillebrand, G., et al., "Integration-Based Cooperation in Con-Current Engineering", Enterprise Distributed Object Computing Workshop, Nov. 3, 1998, pp. 344-355.

Microsoft Office 2000 Professional Edition 1999, Chapter 12, pp. 265-284.

De Baar, Dennis J. M. J., et al., "Coupling Application Design and user interface design", Proceedings of the SIGCHI Conference on Human Factors in computing systems, ACM Press, 1992, pp. 259-266.

Hill, Ralph D., "The Abstraction-link-view program: Using constraints to connect user interfaces to applications", Proceedings of the SIGCHI conference on Human factors in computing systems, 1992, pp. 335-342.

Edwards, W. Keith, Flexible Conflict Detection and Management in Collaborative Applications, ACM Symposium on User Interface Software and Technology 1997, pp. 139-148.

Greenberg, Saul, et al., "Real Time Groupware as a Distributed System: Concurrency Control and its Effect on the Interface", Proceedings of the 1994 ACM conference on Computer supported cooperative work, pp. 207-217.

Bentley R., et al., "Basic Support for Cooperative Work on the World Wide Web", International Journal of Human-Computer Studies, Jun. 1997, vol. 46, No. 6, pp. 827-846.

Dourish, Paul, et al., "Awareness and Coordination in Shared Workspaces", Proceedings of the 1992 ACM conference on Computer-supported cooperative work, 1992, pp. 107-114.

Greenberg, Saul, et al. "Groupware toolkits for synchronous work", Technical Report 96-589-09, Department of Computer Science, University of Calgary, 1996.

Galli, Ricardo, "Data Consistency Methods for Collaborative 3D Editing", Ph.D. thesis, Universitat de les Iles Balears, Plama de Mallorca, Spain, Nov. 2000.

Bhola, Sumeer, et al., "Responsiveness and consistency tradeoffs in interactive groupware", Proceedings of 7th ACM Conference on Computer Supported Cooperative Work, Nov. 1998, pp. 79-88.

Bhola, Sumeer, et al., "1/k Phase Timestamping for Replica Consistency in Interactive Collaborative Applications", Georgia Institute of Technology, Jan. 7, 1999, pp. 1-10.

* cited by examiner

CELL DESCRIPTOR

BACKGROUND

The present invention relates to the field computer-aided design (CAD), computer aided manufacturing (CAM), computer aided engineering (CAE), and product lifecycle management systems (PLM).

Known CAD/CAM/CAE/PLM systems (hereinafter "CAD" systems) generally include a geometrical modeler, which is in charge of building and maintaining model geometry at all times. Each geometrical element of a model, that is to say each vertex, edge, face and each volume of the model, corresponds to a different cell in the geometrical modeler. For example, a model of a square box would have a cell for each corner of the box (eight cells), each edge of the box (twelve cells), each face of the box (six cells), and the volume of the box (one cell). Generally, each cell has a unique identifier, and contains data defining the specific geometric feature with which it is associated.

More advanced known CAD systems build the geometry of a model from higher level specifications, called features, which are more intuitive for users and provide the user with a more flexible and more general way of defining the geometry he seeks to achieve. In such feature-based systems, a model is defined as a set of features. An example of a feature would be a cylinder, a hole, a fillet on an edge, or a rectangular box. Features are often represented in a feature tree, which is a listing of all of the features comprising a model. A feature tree can exist in many forms. For example, it can be expressed in the form of a simple table listing all the features of the model, or it can take the form of feature icons displayed on the screen of a CAD system simultaneously with the display of the model.

The geometry corresponding to the set of features is a set of cells, in which each vertex, each edge, each face and each volume corresponds to a specific cell. A model feature, depending on its character and complexity, when translated into cells, may translate into as few as no cells (as in the case of a non-geometrical feature, such as a geometrical constraint), one cell, or many geometrical cells. On the other hand, each geometrical cell may come from one or more features. In other words, two or more features of a model may have common cells. In feature-based CAD systems, the geometric modeler is usually associated with a component, sometimes called the topological journal, which keeps track of the history of topological modifications in the model, and another component, sometimes called the generic name server, discussed below.

Some features of a model can be expressed purely in terms of their geometrical characteristics. For example, a parallelepiped box can usually be characterized simply by its dimensions in an x, y, z coordinate system. Other features, however, cannot be so simply characterized. For example, a particular edge of the box referred to above cannot usually be identified purely by its geometrical characteristics. It is only by reference to the box and by additional specifications of its position on the box that the edge can be uniquely identified. Such a unique identifier of a cell containing this additional information is known as the "generic name" of the cell, and is generated by the generic name server. The generic name of a cell is stored in the model together with the cell itself.

Current generic naming schemes suffer from a lot of drawbacks. The generic names created by the system, when they can be accessed, are extremely complex to read so that it is almost impossible for all but the most experienced computer experts to read and/or write generic names. Also, they are based on system logic, which is usually quite different from the logic employed by users when envisioning models. These drawbacks make it very difficult if not impossible for users to write a script describing cells they want to act upon. This is a major disadvantage of current systems, particularly for users who want to design and modify a model by means of scripting language only. It also prevents users from using their own logic of the association between features by forcing them to rely on the associativity defined by the system's own logic.

There is therefore a need for a system that would allow a user to easily identify a cell or set of cells of a model using simple and intuitive syntax.

SUMMARY OF THE INVENTION

Accordingly, the present invention provides a system, method, and apparatus for providing greatly increased productivity in CAD modeling. The invention presents a system and method for generating and using "cell descriptors" for some or all of the geometrical cells of a model, the generated cell descriptors being easily scriptable, that is to say, capable of being declared by a user in a script by using a simple and intuitive syntax. The cell descriptors serve the same function as the generic names generated by the generic name server, but have several advantages, which are disclosed herein.

The cell descriptor system of the invention consists in the definition of a set of constraints on the properties of the target cell or set of cells. The constraints relate to cell information already available in CAD systems. Five types of constraints have been defined in the preferred embodiment:

1. Constraints relative to cell dimension: a vertex would be of zero dimensions, an edge one-dimensional, a face two-dimensional and a volume three-dimensional.
2. Constraints based on the topology, that is, how the cells are arranged with respect to one another, including the concept of neighborhood.
3. Constraints based on the history of the model evolution, for example, successive creations, fusions, scissions and reuses that gave birth to the cell. Thus, for example, the user could write a script identifying the intersection of two cylinders in a model, even though the two cylinders no longer exist as such cylinders in the model. However, the intersection of the two cylinders can be derived from the data containing the history of the model evolution.
4. Constraints based on specific attributes. The attributes are of two sorts. Attributes that are defined by the specific geometric modeler being used in a system (for example attributes related to spatial positioning, such as UP, DOWN, RIGHT, LEFT, FRONT, BACK), or attributes that are attached to a feature by the user herself (such as colors, material characteristics, manufacturing properties, technological attributes . . . ).
5. Constraints based on geometrical indications. For example, such a constraint could be all faces that are visible in a given direction (i.e., along a given vector), all the spheres in a model, all planar faces, all the faces having a certain area, etc.

Each type of constraint, as well as each actual constraint, can be described in a simple and intuitive language that considerably simplifies the declaration of constraints by the average user.

In addition, according to another aspect of the invention, different types of constraints can be combined in a single constraint by means of Boolean operators.

According to another aspect of the invention, the cell descriptors are "persistent", that is to say, they can be saved and loaded as part of the model itself.

According to another aspect of the invention, the cell descriptors are amenable to distribution, e.g., over communication networks, to other machines, even if these other machines use different geometric modelers and associated components. In the latter case, only a very simple interpreter would need to be added to the other machines' components to allow the cell descriptors to be understood as such by the other machines.

DETAILED DESCRIPTION OF THE INVENTION

Figure 1:
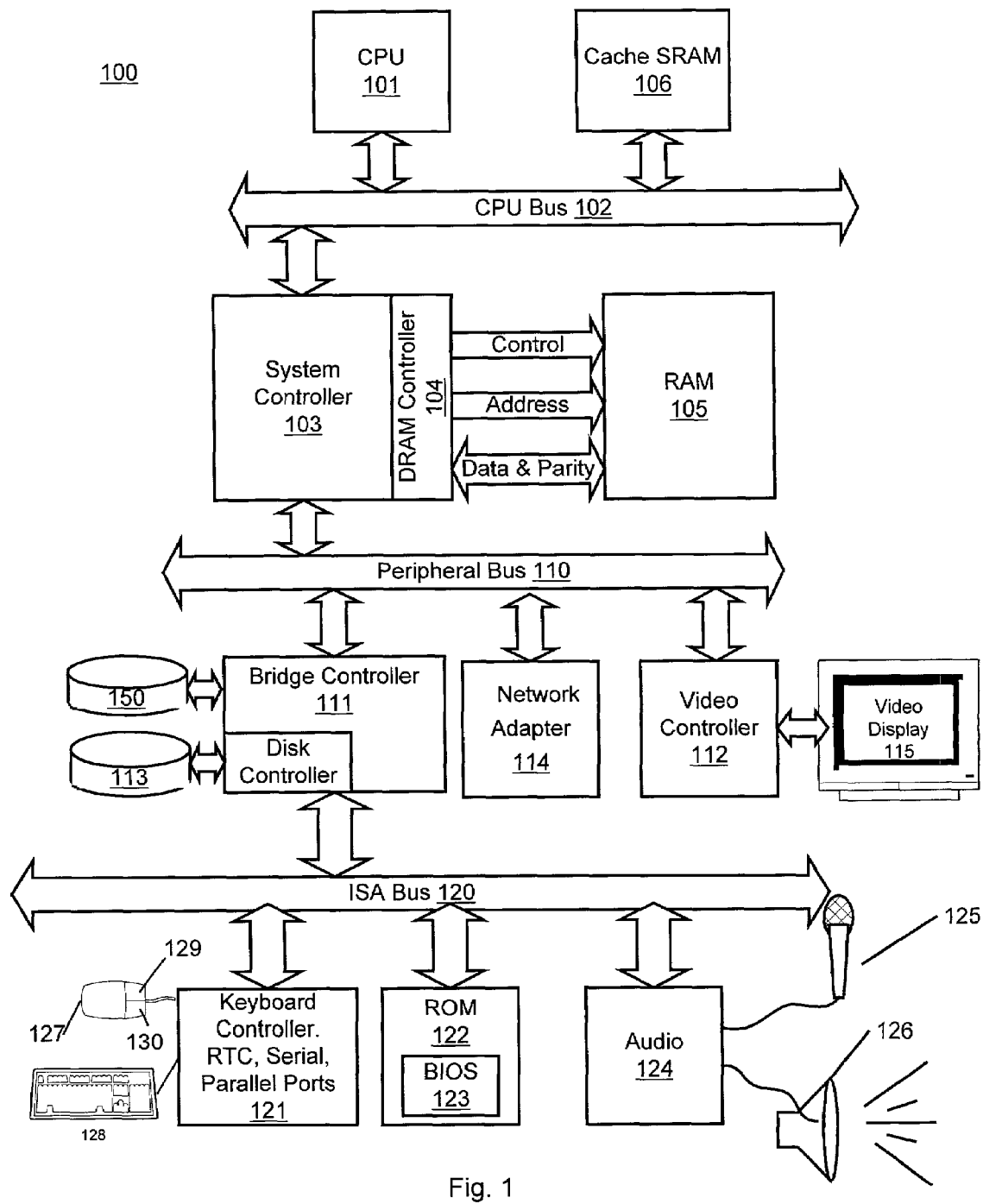
FIG. 1 is a block diagram of a computer system capable of use with the present invention.

Referring to FIG. 1, physical resources of a computer system 100 capable of use in practicing the present invention are depicted. The computer 100 has a central processor 101 connected to a processor host bus 102 over which it provides data, address and control signals. The processors 101 may be any conventional general-purpose single-chip or multi-chip microprocessor such as a Pentium® series processor, a K6 processor, a MIPS® processor, a Power PC® processor or an ALPHA® processor. In addition, the processor 101 may be any conventional special purpose microprocessor such as a digital signal processor or a graphics processor. The microprocessor 101 can have conventional address, data, and control lines coupling it to a processor host bus 102.

The computer 100 can include a system controller 103 having an integrated RAM memory controller 104. The system controller 103 can be connected to the host bus 102 and provide an interface to random access memory 105. The system controller 103 can also provide host bus to peripheral bus bridging functions. The controller 103 can thereby permit signals on the processor host bus 102 to be compatibly exchanged with signals on a primary peripheral bus 110. The peripheral bus 110 may be, for example, a Peripheral Component Interconnect (PCI) bus, an Industry Standard Architecture (ISA) bus, or a Micro-Channel bus. Additionally, the controller 103 can provide data buffering and data transfer rate matching between the host bus 102 and peripheral bus 110. The controller 103 can thereby allow, for example, a processor 101 having a 64-bit 66 MHz interface and a 533 Mbytes/second data transfer rate to interface to a PCI bus 110 having a data path differing in data path bit width, clock speed, or data transfer rate.

Accessory devices including, for example, a hard disk drive control interface 111 coupled to a hard disk drive 113, a video display controller 112 coupled to a video display 115, and a keyboard and mouse controller 121 can be coupled to a bus 120 and controlled by the processor 101. The computer system can include a connection to a computer system network, an intranet or an internet. Data and information may be sent and received over such a connection.

The computer 100 can also include nonvolatile ROM memory 122 to store basic computer software routines. ROM 122 may include alterable memory, such as EEPROM (Electronically Erasable Programmable Read Only Memory), to store configuration data. BIOS routines 123 can be included in ROM 122 and provide basic computer initialization, systems testing, and input/output (I/O) services. The BIOS 123 can also include routines that allow an operating system to be "booted" from the disk 113. Examples of high-level operating systems are, the Microsoft Windows 98™, Windows NT™, Windows 2000™,UNIX, LINUX, the Apple MacOS™ operating system, or other operating system.

An operating system may be fully loaded in the RAM memory 105 or may include portions in RAM memory 105, disk drive storage 113, or storage at a network location. The operating system can provide functionality to execute software applications, software systems and tools of software systems. Software functionality can access the video display controller 112 and other resources of the computer system 100 to provide models of objects on the video computer display 115.

Figure 2:
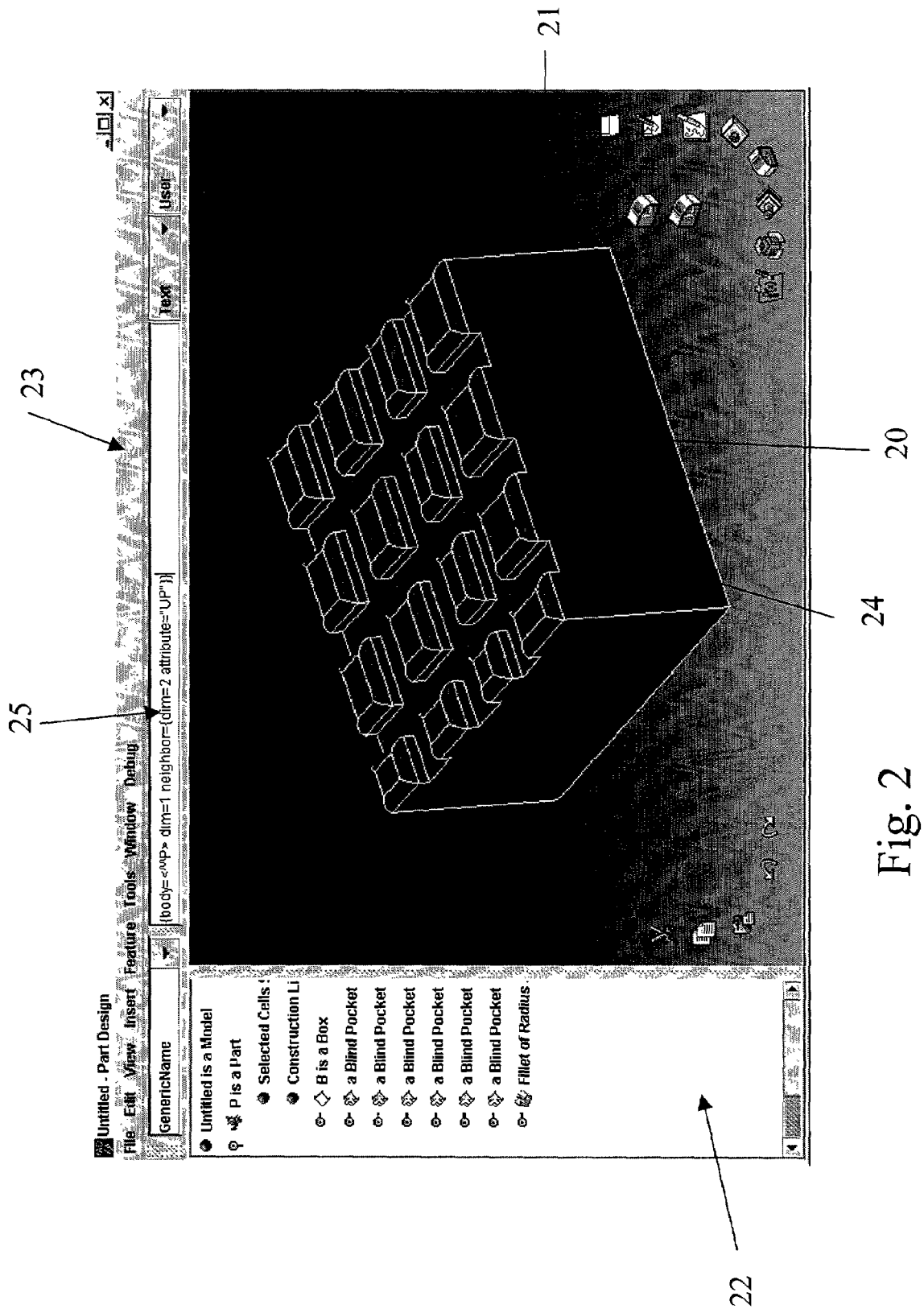
FIG. 2 is an example of a CAD system display of a model showing a cell descriptor script input according to the present invention.

A detailed description of the cell descriptor is provided by referring to the example shown in FIG. 2. In FIG. 2, a model is shown on a CAD system display. The model 20, resembling a waffle iron, is displayed such that two of the side faces and the upper surface are visible. In this particular example, the display is separated into a model display portion on the right 21, a feature tree portion on the left 22, and menu toolbars 23 along the top of the display. It is to be understood that the configuration of the display can be varied in many ways, which are evident to a person of skill in the art.

In this particular example, the user wishes to place a fillet on all of the edges of the raised portions of the upper surface, a representative one of which is designated by reference number 24. In fact, FIG. 2 shows the model with the fillets already in place, for ease of illustration. As is readily discernable from FIG. 2, the number of edges onto which a fillet is to be placed is rather large (i.e., 64 edges). Under existing systems, each edge would have to be separately designated to be identified as the context of a fillet command. This could be done in existing systems, for example, by placing a cursor over each edge and clicking a mouse while holding the Ctrl key. However, with the present invention, all of the desired edges can be identified with one script, which is written by the user using a simple and intuitive syntax. Thus, in the preferred embodiment, all the desired edges can be identified and acted upon with only two user interactions.

Thus, in the example, the user commences a fillet command by selecting any edge of the model and designating that a fillet is to be placed on the edge. In practice, the user would select an edge that is easily selectable in the display, such as edge 24; however, the user may select any edge to commence the command. When this is done, the user can then designate the edge or edges onto which he wishes the system to place a fillet by writing a cell descriptor script. In the present example, the user types the cell descriptor in the area on the display 25 designated for this purpose. In this example, the user would write the following representative script:

"{body=<^P>dim=1 neighbor={dim=2 attribute="UP"}}"

The script means that from the part (body=<^^P>), we select the edges (dim=1) that are connected to (neighbor) faces (dim=2) that carry the "UP" attribute (attribute="UP").

Thus the system is instructed to add fillets to each edge that matches the given cell descriptor. The system will run the script and return a list of cells that match the script. The fillet command is then performed on each of the cells in the list.

The example illustrates the vast improvement in productivity that is achieved with the present invention. Rather than having to pick each desired edge one by one, and perform a fillet command on each edge, the user need only designate one fillet command, and write a simple script to identify all of the desired edges. It will be understood by a person of ordinary skill in the art that the particular syntax used in writing the script can vary, provided that the script conveys the presence of one or more of the constraints discussed above.

Another example is provided that demonstrates the power of the tool provided by the present invention. Focusing again on FIG. 2, we can see from the feature tree that the model consists of a box to which six "blind pockets" have been applied along the top face. Three of the blind pockets run parallel to one side of the box, and the other three run perpendicular to the first three blind pockets. This creates the "waffle iron" or "chocolate bar" pattern on the top face of the box. Suppose that the user wishes to add fillets only to the outside edges of the face with the waffle iron surface. There are sixteen such edges (four per side) that were created when the blind pockets were added. These sixteen edges are the remaining portion of the original four edges that existed along the top face of the box prior to the addition of the blind pockets. As such, they can be defined using the history data for the model. After having commenced a fillet command, the user then would write a script specifying that the edges to which the fillets should be added are those edges that were connected to the upper face of the box prior to the addition of the blind pockets. The script would read:

"{body=<^^P>dim=1 from={body=^B dim=1}
    neighbor={dim=2 attribute="UP"}}"

The script means that from the part (body=<^^P>), we select the edges (dim=1) that come from the B box edges (from={body=^B dim=1}) that are connected to (neighbor) faces (dim=2) that carry the "UP" attribute (attribute="UP").

In the foregoing example, the user is able, with one script, to designate sixteen edges using information that is not directly in the model itself, but is found in history data. This greatly facilitates the design process. It can be seen that through various combinations of the constraints described above, the user will be able to select any portion of the model he desires with relative ease.

It is further seen that the vast improvement in productivity is achieved partly as a result of the fact that the cell descriptor is composed by using constraints that are readily understandable, and that relate directly to the user's logic. The general process by which the system understands and applies the cell descriptor is now described. Focusing on FIG. 3, a schematic representation of the cell descriptor processing system is shown. When a user wishes to target a cell or a set of cells, he declares in a cell descriptor script 30 the constraint or the sequence of constraints that define the target, as described above. The system, starting with the first declared constraint, goes through the whole set of cells in the model to retain only those cells which meet the constraint. If more than one constraint is declared, the system applies the next constraint to the subset of cells retained at the previous level. This "filtering" process ends when all constraints have been applied. The set of constraints that could be applied 32 are the constraints discussed above relating to dimension, neighborhood, history, attributes and geometry. The arrows in FIG. 3 between the interpreter and the CAD system signify the exchange of codes from the interpreter to the appropriate portion of the system. The interpreter determines, based on the filters in the cell descriptor, which portion of the system to access to obtain the desired cell information. The set of cells available at the end of the process 33 are those which meet all the criteria set by the user in the cell descriptor. The corresponding cells can then be acted upon according to a user-defined command.

Figure 3:
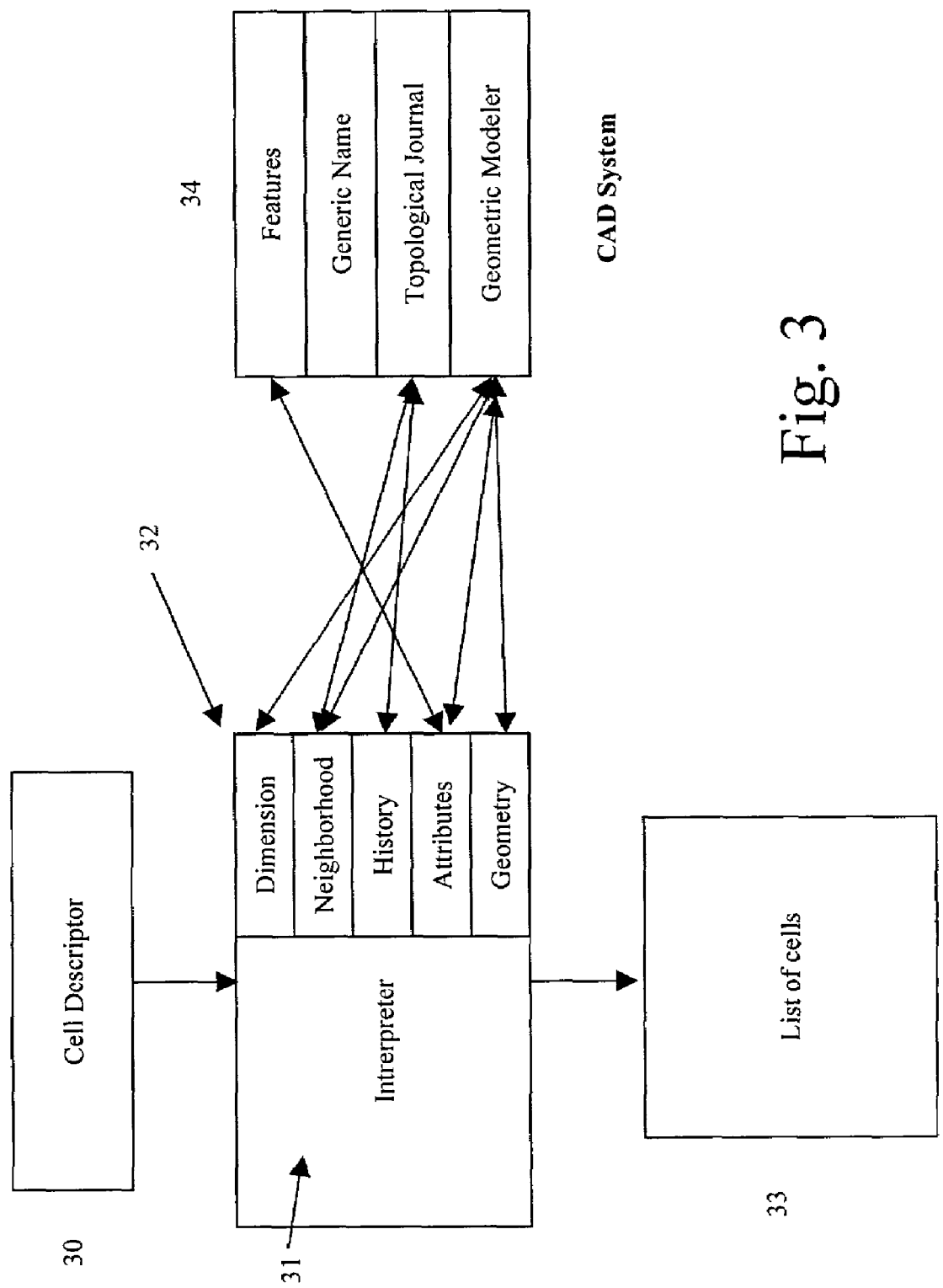
FIG. 3 is a schematic diagram showing the progression from cell descriptor to a list of cells, according to the present invention.

In FIG. 3, an interpreter 31 is shown interfacing with the geometric modeler 34 to obtain a list of cells. The interpreter deciphers the syntax of the cell descriptor and determines, for each filter, the portion(s) of the CAD system that must be accessed to obtain a list of cells meeting the constraints of the filter. In the event that the cell descriptor script is being processed by a system that uses a geometric modeler different from the system in which the cell descriptor originated, then the interpreter also serves the function of determining for the specific geometric modeler being used those portion(s) of the modeler that must be accessed to obtain a list of cells meeting the constraints of the cell descriptor. The cell descriptor of the present invention is general enough to accommodate all CAD systems. The resulting list of cells generated is the same, regardless of the system used.

Figure 4:
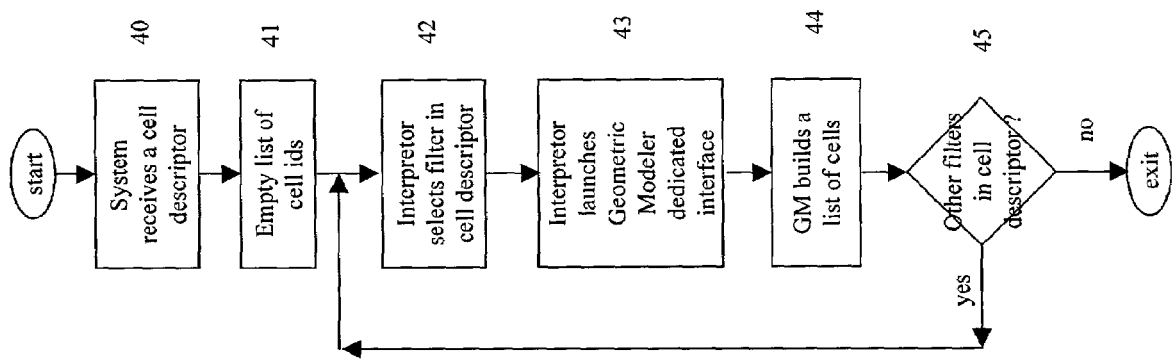
FIG. 4 is a table that graphically displays the steps taken by the system of the present invention to create a list of cells in accordance with the cell descriptor of the present invention.

Referring to FIG. 4, the general process by which the system understands and applies the cell descriptor is shown. The process of the invention begins when the system receives a cell descriptor (40). As discussed, the cell descriptor may have been generated by the user locally, or may have been received by the system through a communications network from another user or system. A list for storing the identification of cells ("cell ID") is reset (41), and the interpreter selects the first filter in the cell descriptor script (42). The interpreter then launches an algorithm asking the geometric modeler for a list of cell ids that meet the requirement of the first filter or constraint (43). In response, the geometric modeler builds a list of cell IDs that meet the constraint (44), which is stored in the list of cell IDs. The system then determines whether any other filters are in the cell descriptor (45). If so, the process is repeated for the next filter using the subset of cells identified in the previous level as a starting point. The cell IDs of such cells are stored, and the process repeats until all of the filters in the cell descriptor have been applied, and a final list of cell IDs is stored.

The present invention also provides for vast improvements in productivity by its facilitation of the use of "macros". Macros are macro-commands that allow a user to tie several actions together and then activate the actions with one step. In a CAD/CAM/CAE/PLM application, the user can assemble in a macro a series of commands that he wishes to use repeatedly during a design process. For example, a user may wish to add a surface finish to each face of an object that faces "up", and in addition, specify a color for such faces. The user could create a macro adding a color to each selected face, and specifying a surface finish for each face. The user would then individually select in serial fashion the "up" faces, and run the macro on each face.

It would be of great utility to be able to write macros that also select the desired portion of the part (faces facing "up" in the example) upon which the action is to be taken. This is not possible in existing systems because the generic name for each face is unique, as discussed above, and is therefore not amenable to use in a macro. However, using the cell descriptor of the present invention, it is possible to specify such cells as part of the macro. This aspect of the invention is a powerful tool for increasing productivity. Such macros could not only be transferable from face to face in a given object, but could be transferable to different objects. In fact, a macro of the sort described could even be transferred to a different CAD system, provided it is written in software-independent language, and the transferee system is equipped with an interpreter for deciphering the cell descriptor.

In another aspect of the invention, cell descriptors provide a vehicle for the introduction of design concepts based on the user's (or an enterprise's) knowledge. For example, above was discussed the case of adding a fillet to "all the external edges" of the "waffle iron" model of FIG. 2. However, through the introduction of knowledge-based constraints, the user could select, using a cell descriptor, "all dangerous edges" of the object. The user need only define, or import from another source, the definition of a dangerous edge (for example, edges having a chamfer radius below a specified minimum). The definition of "dangerous" would be found in a macro.

The foregoing is an example of the use of knowledge-based constraints being used to find cells in a model in its existing state, or "static state". Using the cell descriptor of the present invention, a user also could specify cells "dynamically", that is, the cell descriptor would specify a value for a parameter of a cell that is not fixed in the model, but is calculated during the interpretation of the cell descriptor. As an example, consider the case where a device, such as a robot, is positioned within a work cell, and the user desires to know what cell of the model (the robot) will collide with an adjacent object in the work cell when the robot is swung through an arc. The cell descriptor of the present invention could be written to access existing functionality of the CAD system to find the desired cells.

In a further aspect of the invention, the cell descriptor method of the present invention can be used to create "generative scripts", i.e., a purely textual description of an object. For example, referring to FIG. 2, the "waffle iron" model can be created using only a scripting language using the following text as a representative example:

MyModel isa Model

```
{
components:
    P isa Part
    {
    components:
        B isa Box
        {
        properties:
            Height = 60.0
```

-continued

```
            Width = 100.0
            Depth = 100.0
        }
        Pocket1 isa Pocket
        {
        properties:
            Height = 10.0
            Width = 10.0
            Depth = 100.0
            X = 30.0
            Y = 0.0
            Z = 30.0
        }
        Pocket2 isa Blind Pocket ...
        Pocket3 isa Blind Pocket ...
        Pocket4 isa Blind Pocket ...
        Pocket5 isa Blind Pocket ...
        Pocket6 isa Blind Pocket ...
    }
}
```

In the foregoing example, the model is defined as being composed of a part "P", which is, in turn, composed of a box "B", and six blind pockets. The basic shape of the waffle iron part P is box B, with the specified height, width and depth dimensions (properties). The box is thus created and placed at the specified location in a three dimensional (x,y,z) coordinate system. The waffle iron pattern on the top face of the box is made by adding six "blind pockets" to the box, as discussed above. The six blind pockets are defined by specifying the height, width and depth of the blind pocket, and specifying where in the x,y,z coordinate system the blind pockets would be placed so as to change the shape of the top face of the box. The blind pockets each create a void in the part, which ultimately yields the waffle iron configuration in the top of the box. In the example script above, only the first blind pocket is defined. The second through sixth blind pockets are defined in a similar manner, but with different x,y,z coordinates. As the box is built, the CAD system creates a generic name for each geometric cell of the model.

Having created the basic shape of the model with the foregoing script, the user would then need to put fillets on the edges of the waffle iron pattern, as depicted in FIG. 2. However, this is not feasible without the cell descriptor of the present invention since the edges to which the fillets are to be applied are not easily identified. As discussed above, each of the edges has a unique generic name that is based on system logic, and therefore there is no way to reference one or several edges and add a fillet feature on them with a simple script. In order to add the fillets on the upper edges, a cell descriptor is needed. The script set forth above is modified with the addition of the cell descriptor as follows:

MyModel isa Model

```
{
components:
    P isa Part
    {
    components:
        B is a Box ...
        Pocket1 isa Blind Pocket ...
        Pocket2 isa Blind Pocket ...
        Pocket3 isa Blind Pocket ...
        Pocket4 isa Blind Pocket ...
```

-continued

```
        Pocket5 isa Blind Pocket ...
        Pocket6 isa Blind Pocket ...
        Fillet1 isa Fillet
        {
            edges = " {body=<^^P> dim=1 neighbor={dim=2 attribute="UP"}}"
            radius = 5.0
        }
    }
}
```

Here the cell descriptor designates that a fillet of radius 5.0 be placed on the edges specified in the cell descriptor.

It can be seen that the cell descriptor of the present invention allows a user to create an object entirely from a textual script, without reference to a graphical depiction of the object. The user need only visualize the object in his mind, and can write a script creating the object. This feature is yet another example of the way the present invention can increase the productivity of the user.

It is to be understood that the foregoing method can be applied to any system for designing objects, including any CAD/CAM/CAE/PLM system. The invention may be implemented in digital electronic circuitry, or in computer hardware, firmware, software, or in combinations of them. Apparatus of the invention may be implemented in a computer program product tangibly embodied in a machine-readable storage device for execution by a programmable processor; and method steps of the invention may be performed by a programmable processor executing a program of instructions to perform functions of the invention by operating on input data and generating output.

The invention may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially designed ASICs (application-specific integrated circuits).

The preferred embodiment of the present invention has been described. It will be understood that various modifications may be made without departing from the spirit and scope of the invention. Therefore, other implementations are within the scope of the following claims.

What is claimed is:

1. A computer system operation method for use with a CAD system in modeling objects, said method providing a means for identifying geometric cells of a model, the method comprising:

a) receiving input comprising one or more constraints relating to geometric cell information, wherein at least one of said input constraints is selected from the group consisting of:
  a) constraints relating to cell dimension;
  b) constraints relating to the topology of a cell;
  c) constraints relating to the history of the model evolution;
  d) constraints relating to specific attributes of a cell; and
  e) constraints relating to geometrical indications of a cell, and
wherein each constraint is specified in a declarative syntax, wherein the declarative syntax is simple and intuitive;
b) selecting the first constraint of said input and identifying the components of the CAD system that must be accessed to find geometric cells meeting the requirements of the constraint;
c) searching the cells of the model and retaining as a subset only the cells that meet the requirement of the first constraint of said input;
d) selecting the next constraint of said input and identifying the components of the CAD system that must be accessed to find geometric cells meeting the requirements of said next constraint;
e) searching the subset of cells and retaining in the subset only the cells that meet the requirement of said next constraint of said input; and
f) repeating steps d) and e) for each of the remaining constraints in said input.

2. The method of claim 1 wherein the declarative syntax comprises a scripting language program received as a CAD system user input.

3. A CAD apparatus comprising:
an input device; and
a central processing unit;
wherein the central processing unit runs an application program comprising code for:
a) receiving input comprising one or more constraints relating to geometric cell information of a model, wherein at least one of said input constraints is selected from the group consisting of:
  a) constraints relating to cell dimension;
  b) constraints relating to the topology of a cell;
  c) constraints relating to the history of the model evolution;
  d) constraints relating to specific attributes of a cell; and
  e) constraints relating to geometrical indications of a cell, and
wherein each constraint is specified in a declarative syntax, wherein the declarative syntax is simple and intuitive;

b) selecting the first constraint of said input and identifying the components of the CAD system that must be accessed to find geometric cells meeting the requirements of the constraint;
c) searching the geometric cells of the model and retaining as a subset only the geometric cells that meet the requirement of the first constraint of said input;
d) selecting the next constraint of said input and identifying the components of the CAD system that must be accessed to find geometric cells meeting the requirements of said next constraint;
e) searching the subset of geometric cells and retaining in the subset only the geometric cells that meet the requirement of said next constraint of said input; and
f) repeating steps d) and e) for each of the remaining constraints in said input.

4. Computer executable code stored on a computer readable medium, the code comprising means for causing a CAD computer system to perform a method providing a means for identifying geometric cells of a model, the method comprising:
   a) receiving from a user an input comprising a script comprising one or more constraints relating to cell information, wherein at least one of said input constraints is selected from the group consisting of:
   a) constraints relating to cell dimension;
   b) constraints relating to the topology of a cell;
   c) constraints relating to the history of the model evolution;
   d) constraints relating to specific attributes of a cell; and
   e) constraints relating to geometrical indications of a cell, and
   wherein each constraint is specified in a declarative syntax, wherein the declarative syntax is simple and intuitive;
   b) selecting the first constraint of said input and identifying the components of the CAD system that must be accessed to find geometric cells meeting the requirements of the constraint;
   c) based on the received script, searching the cells of the model and retaining as a subset only the cells that meet the requirement of the first constraint of said input;
   d) selecting the next constraint of said input and identifying the components of the CAD system that must be accessed to find geometric cells meeting the requirements of said next constraint;
   e) searching the subset of cells and retaining in the subset only the cells that meet the requirement of said next constraint of said input; and
   f) repeating steps d) and e) for each of the remaining constraints in said input.

* * * * *